United States Patent
Schmalriede et al.

(10) Patent No.: US 11,498,492 B2
(45) Date of Patent: Nov. 15, 2022

(54) RETAINING DEVICE FOR AN EXTERIOR ADD-ON PART OF A MOTOR VEHICLE

(71) Applicant: Continental Automotive GmbH, Hannover (DE)

(72) Inventors: Tobias Schmalriede, Ganderkesee (DE); Johannes Link, Niedereschach (DE); Eduard Krumm, Villingen-Schwenningen (DE); Thomas Grünig, Mönchweiler (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/248,975

(22) Filed: Feb. 16, 2021

(65) Prior Publication Data

US 2021/0162930 A1  Jun. 3, 2021

Related U.S. Application Data

(63) Continuation of application No. PCT/EP2019/070647, filed on Jul. 31, 2019.

(51) Int. Cl.
  *B60R 11/00* (2006.01)
  *B60R 11/04* (2006.01)

(52) U.S. Cl.
  CPC .............. *B60R 11/00* (2013.01); *B60R 11/04* (2013.01); *B60R 2011/004* (2013.01);
  (Continued)

(58) Field of Classification Search
  CPC ........... B60R 11/0211; B60R 2011/004; B60R 2011/0049; B60R 2011/0082;
  (Continued)

(56) References Cited

U.S. PATENT DOCUMENTS 4,186,905 A * 2/1980 Brudy .................. B60R 1/0617
                                                          248/478
4,789,232 A   12/1988 Urbanek
(Continued)

FOREIGN PATENT DOCUMENTS

DE      202005010775 U1   11/2006
DE      102010001268 A1    7/2011
(Continued)

OTHER PUBLICATIONS

Deutsches Patent-un Markenamt Office Action dated Aug. 2, 2019 for the counterpart German Patent Application No. 10 2018 213 818.4.
(Continued)

*Primary Examiner* — Nkeisha Smith

(57) ABSTRACT

A retaining device for an exterior add-on part of a motor vehicle comprises a base part for exterior mounting on the motor vehicle, on which a connecting element is mounted with a first pivoting device, via which the connecting element can be pivoted relative to the base part about a first pivot axis between a working position and at least one protection position. A first spring device, via which the connecting element can be returned from the at least one protection position into the working position. A retaining element mounted on the connecting element, by a second pivoting device having a second spring device, to be pivotable about a second pivot axis between the working position and the protection position, wherein the retaining element can be returned to the working position by the second spring device.

19 Claims, 2 Drawing Sheets

(52) U.S. Cl.
CPC ............ *B60R 2011/0049* (2013.01); *B60R 2011/0082* (2013.01); *B60R 2011/0087* (2013.01); *B60R 2011/0089* (2013.01)

(58) Field of Classification Search
CPC ..... B60R 2011/0087; B60R 2011/0089; B60R 2011/008; B60R 2011/0084; B60R 2011/0085
USPC .................................. 248/205.1, 27.1, 27.3
See application file for complete search history.

(56) References Cited

U.S. PATENT DOCUMENTS

| | | | | |
|---|---|---|---|---|
| 5,375,014 | A | 12/1994 | Fujie | |
| 7,445,191 | B2* | 11/2008 | Courbon | B60R 1/0605 359/872 |
| 7,654,425 | B2* | 2/2010 | Huang | B60R 11/04 224/559 |
| 9,056,587 | B2* | 6/2015 | Montgomery | B60K 35/00 |
| 9,616,818 | B1* | 4/2017 | Zambrano | B60R 11/06 |
| 10,155,484 | B2* | 12/2018 | Henion | B60R 1/078 |
| 10,471,902 | B2* | 11/2019 | Fischer | G03B 17/02 |
| 2020/0408238 | A1* | 12/2020 | McKeirnan, Jr. | B60R 11/04 |
| 2021/0094460 | A1* | 4/2021 | Beilman | B62D 25/18 |

FOREIGN PATENT DOCUMENTS

| | | |
|---|---|---|
| DE | 102012015395 B3 | 11/2013 |
| DE | 102016209927 A1 | 12/2017 |
| EP | 3254902 A1 | 12/2017 |
| GB | 1278865 A | 6/1972 |

OTHER PUBLICATIONS

Deutsches Patent-un Markenamt Search Report dated May 7, 2019 for the counterpart German Patent Application No. 10 2018 213 818.4.

Deutsches Patent-un Markenamt Notice of Granted Patent dated Apr. 6, 2020 for the counterpart German Patent Application No. 10 2018 213 818.4.

International Search Report and the Written Opinion of the International Searching Authority dated Sep. 26, 2019 for the counterpart PCT Application No. PCT/EP2019/070647.

* cited by examiner

RETAINING DEVICE FOR AN EXTERIOR ADD-ON PART OF A MOTOR VEHICLE

CROSS-REFERENCE TO RELATED APPLICATIONS

This application is a continuation of PCT Application PCT/EP2019/070647, filed Jul. 31, 2019, which claims priority to German Application 10 2018 213 818.4, filed Aug. 16, 2018; the contents of all above-named applications are incorporated herein by reference.

TECHNICAL FIELD

The invention relates to a retaining device for an exterior add-on part of a motor vehicle.

BACKGROUND

DE 10 2012 015 395 B3 discloses a camera arm for a camera of a mirror substitute system of a motor vehicle, with a first housing element and a second housing element. The first housing element receives an image-recording unit of the mirror substitute system camera, and the second housing element is configured to be connected positionally fixedly to the bodywork of the motor vehicle. The first housing element can be fixed with respect to the second housing element in a fixed non-folded operating position. Furthermore, a pivot mechanism is provided between the first housing element and the second housing element, so that the first housing element is pivotable relative to the second housing element about a pivot axis, and can be folded away or folded in under the effect of a greater force than the force normally encountered in operation. The pivot mechanism contains a spring mechanism which preloads the first housing element relative to the second housing element in a non-folded operating position. This preload offers a return function, so that, after a collision with inward pivoting of the first housing element relative to the second housing element, the first housing element returns to its operating position without the driver having to make a manual adjustment.

A retaining device for an exterior add-on part of a motor vehicle, by means of which the exterior add-on part can be positioned particularly easily relative to an outer surface of the motor vehicle, and at the same time is particularly well protected from collision damage is therefore desirable.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A retaining device for an exterior add-on part of a motor vehicle has a base part for external mounting on a motor vehicle. A connecting element is mounted on the base part by means of a first pivoting device, via which the connecting element can be pivoted relative to the base part about a first pivot axis between a working position and at least one protection position. The first pivot device has a first spring device, via the spring force of which the connecting element can be returned from the at least one protection position into the working position.

In other words, the base part is configured to be arranged on an outside of the motor vehicle. The connecting element, which in particular is elongate, is attached at its one end to the base part via the first pivot device so as to be pivotable relative to the base part. The working position describes an orientation of the retaining device relative to the base part. In the working position, by means of the exterior add-on part, for example information on an environment of the motor vehicle is determined so that this information can be provided for controlling the motor vehicle. The information obtained by means of the exterior add-on part may be output in the interior of the motor vehicle and/or transmitted to an electronic computer device for automatic control of the motor vehicle.

In the at least one protection position of the retaining device, for example the connecting element is arranged such that the exterior add-on part can be protected from damage resulting from collision. In order to allow a positioning of the exterior add-on part in the working position of the retaining device, and at the same time provide a collision protection for the retaining device, a retaining element is provided for receiving the exterior add-on part. The retaining element is mounted on the connecting element by means of a second pivoting device having a second spring device so as to be pivotable about a second pivot axis, which is spaced apart from the first pivot axis and parallel thereto, between the working position and the at least one protection position. The retaining element can be returned from the at least one protection position into the working position by means of the second spring device. For example, the retaining element is elongate and is held at its first end on the connecting element via the second pivot device. At its other end, or at the second end of the retaining element, the retaining element has a receiver for the exterior add-on part, by means of which the exterior add-on part can be received. Thus the exterior add-on part is held on the base part via the retaining element and via the connecting element. The connecting element is pivotable relative to the base part by means of the first pivot device, while the retaining element is pivotable relative to the connecting element by means of the second pivot device. The first spring device and the second spring device each serve to return the connecting element or retaining element respectively from the at least one protection position to the working position.

The working position may be predefined by a spring force of the respective spring devices. In the working position, the retaining element may protrude perpendicularly from the base part with its longitudinal extent direction, in order to set the greatest possible distance between the base part and the exterior add-on part of the motor vehicle in the working position. This may ensure a large detection range for the exterior add-on part for detecting the information on the environment of the motor vehicle. If the retaining device is moved out of the working position into the at least one protection position, the first spring device and/or the second spring device are loaded with a shift force countering the spring force. If the shift force is then eliminated, the retaining device is returned into the working position from the at least one protection position under the effect of the respective spring force from the first spring device and/or the second spring device. Thus, the spring devices allow the retaining device to yield under the shift force acting from the outside on the retaining device or on the exterior add-on part, so that damage to the exterior add-on part can be at least substantially avoided. If the retaining device is not loaded with the shift force, the retaining device is returned to the working position or positioned and held therein by the spring force of the first spring device and/or the second spring device. The retaining device thus allows particularly advantageous protection of the exterior add-on part from damage.

In this context, in the working position, the connecting element is oriented with its longitudinal extent direction at least substantially parallel, in particular precisely parallel, to a surface of the base part. Moreover, it may be provided that the first pivot device and the second pivot device have different pivot directions when the retaining device is returned from the at least one protection position to the working position. Thus by means of the connecting element, the retaining element is returned to the working position in that the connecting element is oriented parallel to the base part by the spring force of the first spring device, and thus for example supported against the base part by resting on the base part. Here, the connecting element draws the retaining element into the working position via the second spring device. In this way, the working position can be predefined with positional precision.

In a further embodiment, it is provided that as an exterior add-on part, a camera device is held on the base part via the connecting element. In other words, the exterior add-on part is a camera device which is arranged on the second end of the retaining element, and is connected to the base part via the retaining element and via the connecting element. Thus the camera device can be attached on the outside of the motor vehicle via the retaining device so as to be pivotable about both pivot axes. By means of the camera device, image data characteristic of the environment of the motor vehicle can be detected. These image data may be transmitted to an electronic computer device of the motor vehicle in order to output the image data into the interior of the motor vehicle, and/or control the motor vehicle depending on the image data detected by the camera device. The camera device may thus be used as a side mirror substitute system. In contrast to a conventional side mirror, the camera device has the advantage that a blind spot in the vicinity of the motor vehicle, and hence a region invisible to the driver of the motor vehicle, can be kept small. By means of the camera device, the environment of the motor vehicle can be detected comprehensively so that the driver of the motor vehicle can for example be informed of the environment of the motor vehicle, in that the image data detected by means of the camera device are output in the interior of the motor vehicle. Alternatively or additionally, the image data may be provided for a driver assistance system, by means of which the motor vehicle can be controlled at least partially automatically. Further, in contrast to a side mirror, the camera device attached to the retaining device may have lower air resistance during travel of the motor vehicle, and hence improves aerodynamics of the motor vehicle in comparison with side mirrors.

In a further embodiment, it is provided that the first spring device and the second spring device each comprise a coil spring, the spring forces of which point in opposite directions. This means that, by means of the spring forces pointing in opposite directions, different return directions can be implemented in the two pivot devices. The different return directions allow a complex pivot movement of the retaining device on shifting of the retaining device between the at least one protection position and the working position. The respective coil springs of the pivot devices allow each of the pivot devices to provide an individual spring force of their coil springs for return from the at least one protection position into the working position. The different pivot directions of the two pivot devices allow the retaining device to compensate for shift forces from different directions, in that the retaining device is adjusted into a respective protection position by loading of at least one of the spring devices. A respective movement curve, along which the exterior add-on part travels during its shift, may be set for example by means of respective spring forces in the coil springs of the spring devices. In this way, the exterior add-on part, which is attached to an outside of the motor vehicle by means of the retaining device, can be protected from damage resulting from an effect of a shift force.

In a further embodiment, it is provided that the first spring device and the second spring device each comprise a compression spring, the spring forces of which run along the respective pivot axes. The respective compression spring loads the connecting element relative to the retaining element or relative to the base part with a spring force acting perpendicularly to the longitudinal extent direction of the connecting element. In this way, the connecting element can be pressed along the respective pivot axes both against the retaining element and also against the base part. For example, at the contact faces of the connecting element with the base part or retaining element respectively, ramps may be provided over which the connecting element can be pressed by loading with the respective spring force of the compression spring against the base part or retaining element, whereby the connecting element is pivoted relative to the base part or retaining element about the respective pivot axis via the ramps. The connecting element can be fixed relative to the base part or retaining element in respective positions, e.g. the working position, via the respective ramps and/or via respective latching elements arranged on the contact faces. The compression springs constitute a simple method by which the connecting element can be positioned relative to the base part or retaining element.

In a further embodiment, it is provided that the first spring device and the second spring device are connected together by a leg spring, via the spring force of which the connecting element and the retaining element can jointly be returned to the working position. This means that the first spring device and the second spring device can be loaded jointly and simultaneously with a spring force by means of the leg spring. For example, the leg spring is supported both on the base part and on the retaining element so as to return the retaining device to the working position from the at least one protection position. By means of the leg spring, for return to the working position, for example the connecting element can be folded out or laid against the base part with its longitudinal extent direction, and the retaining element arranged protruding at least substantially perpendicularly from the base part. By means of the leg spring, the working position may be predefined reproducibly with fixed position via the respective design of the leg spring.

A combination of the above-described embodiments of the spring devices is also possible. Thus one of the spring devices may comprise the coil spring and/or one of the spring devices may comprise the compression spring. In addition, the spring devices may be connected together via the leg spring.

In a further refinement, in addition to the exterior add-on part, at least one further exterior add-on part can be received by the retaining element. In other words, by means of the retaining element, the add-on part and the further add-on part can be positioned relative to the base part. Here, by means of the exterior add-on part and by means of the further add-on part, information on the environment of the motor vehicle can be detected and provided to an electronic computer device of the motor vehicle. By means of the retaining device, in this embodiment of the invention, particularly many exterior add-on parts can be attached to the outside of the motor vehicle, whereby the retaining device can be used efficiently.

In this context, the further exterior add-on part may be a camera device or an antenna or a positioning light or a direction indicator light or a heating element or a cleaning device. In other words, the exterior add-on part and also the camera device and/or the antenna and/or the positioning light and/or the direction indicator light and/or the heating element and/or the cleaning device can be received by means of the retaining device so they can be positioned relative to the outside of the motor vehicle. If the further add-on part is a camera device, then for example two camera devices may be held by means of the retaining device. If both camera devices are oriented in a same direction, then via the mutual distance between the two camera devices, depth information on an environment of the motor vehicle can be obtained. This depth information on the environment of the motor vehicle may be provided to the electronic computer device for controlling the motor vehicle. If the further exterior add-on part is the antenna, in particular a V2X antenna, then by means of the retaining device, an orientation of the antenna or a position of the antenna relative to the motor vehicle can be adjusted. Alternatively or additionally, as a further exterior add-on part, the positioning light and/or the indicator light may be arranged on the retaining device, wherein because of the arrangement spaced from the outer surface of the motor vehicle by means of the retaining device, these elements are clearly visible to further road users. By means of the heating element of a further exterior add-on part, the exterior add-on part held on the base part by means of the retaining device can be protected from icing and/or heated to an operating temperature by means of the heating element. Thus the heating element serves for operation of the exterior add-on part. If in addition to the exterior add-on part, the cleaning device is arranged on the retaining device as a further exterior add-on part, then by means of the cleaning arrangement, the outside of the exterior add-on part and/or the motor vehicle can be freed from dirt. If the exterior add-on part is for example the camera device, then by means of the cleaning device, it can be ensured that the camera device is free from soiling and hence a deterioration in detection of the environment of the motor vehicle by means of the camera device can be at least substantially avoided.

If the exterior add-on part and the further exterior add-on part are each configured as a camera device, wherein a first field of vision of a first of the camera devices is oriented towards the rear in the vehicle longitudinal direction, and a second field of vision of the second camera device is oriented downward in the vehicle height direction. Alternatively or additionally, at least one field of vision of the camera devices may be oriented outward along a vehicle transverse direction and hence pointing away from the motor vehicle. The arrangement of the camera devices on the retaining device, such that their fields of vision are oriented in different directions in the environment of the motor vehicle, allows the environment of the motor vehicle to be detected particularly comprehensively by means of the camera devices. Thus, by means of the camera device, comprehensive image data characteristic of the environment of the motor vehicle can be detected and provided for the electronic computer unit for controlling the motor vehicle. This allows a safe control of the motor vehicle on the basis of the comprehensive information on the environment of the motor vehicle.

In a further embodiment, it is provided that the connecting element is held on the base part so as to be pivotable relative to the base part about a third pivot axis extending parallel to a longitudinal extent direction of the connecting element. In other words, the connecting element is pivotable relative to the base part about its longitudinal extent axis in order to be able to compensate for a shift force acting on the retaining device parallel to the first pivot axis and second pivot axis. In this way, the exterior add-on part can be protected particularly advantageously by means of the retaining device against shift forces acting in the direction of the first pivot axis and second pivot axis, in that the connecting element which is pivotable about the third pivot axis allows an avoidance movement. Thus for example a third pivot device may be provided with a third spring device, by means of which the connecting element can be brought into the working position from the at least one protection position in which the connecting element has avoided the shift force acting along the first pivot axis and second pivot axis.

In a further embodiment, it is provided that the retaining element has a channel which can receive a data line and/or an energy line for a data connection and/or an energy connection of the exterior add-on part. In other words, the retaining element has as a channel a recess extending along the longitudinal extent direction of the retaining element, in which the data line and/or the energy line may be arranged. Alternatively or additionally, the retaining element may have a receiving device for the data line and/or the energy line. By means of the data line and/or the energy line, the exterior add-on part can be connected to the motor vehicle via the base part for energy supply and/or data communication. The energy line allows electrical energy to be provided from the motor vehicle to the exterior add-on part for operation of the exterior add-on part. The data line allows the information on the environment, detected by means of the exterior add-on part, to be provided for the motor vehicle. The channel of the retaining element allows the data line and/or the energy line to be guided along the retaining element while protected from damage. Thus, a secure energy connection and/or information connection along the retaining device is possible.

A system with a retaining device as described already in connection with the retaining device according to the invention, and with an exterior add-on part. The exterior add-on part may be a camera device which may serve as a mirror substitute. This system allows detection of an environment of a motor vehicle comprising the system, wherein the system simultaneously is protected from damage.

A further aspect concerns a motor vehicle, in particular an automobile, in particular a car or a truck or a bus, with a retaining device as described already in connection with the retaining device. By means of the retaining device, an exterior add-on part can be attached to the outside of the motor vehicle. The exterior add-on part is a camera device for detecting an environment of the motor vehicle.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The exemplary embodiment explained below is a preferred embodiment of the invention. In the exemplary embodiment, the described components of the embodiment each represent individual features of the invention that should be considered independently of one another, and that each also develop the invention independently of one another and can therefore also be considered to be part of the invention, either individually or in a combination other than that shown. Furthermore, the embodiment described may be supplemented by further features of the invention already described.

Figure 1:
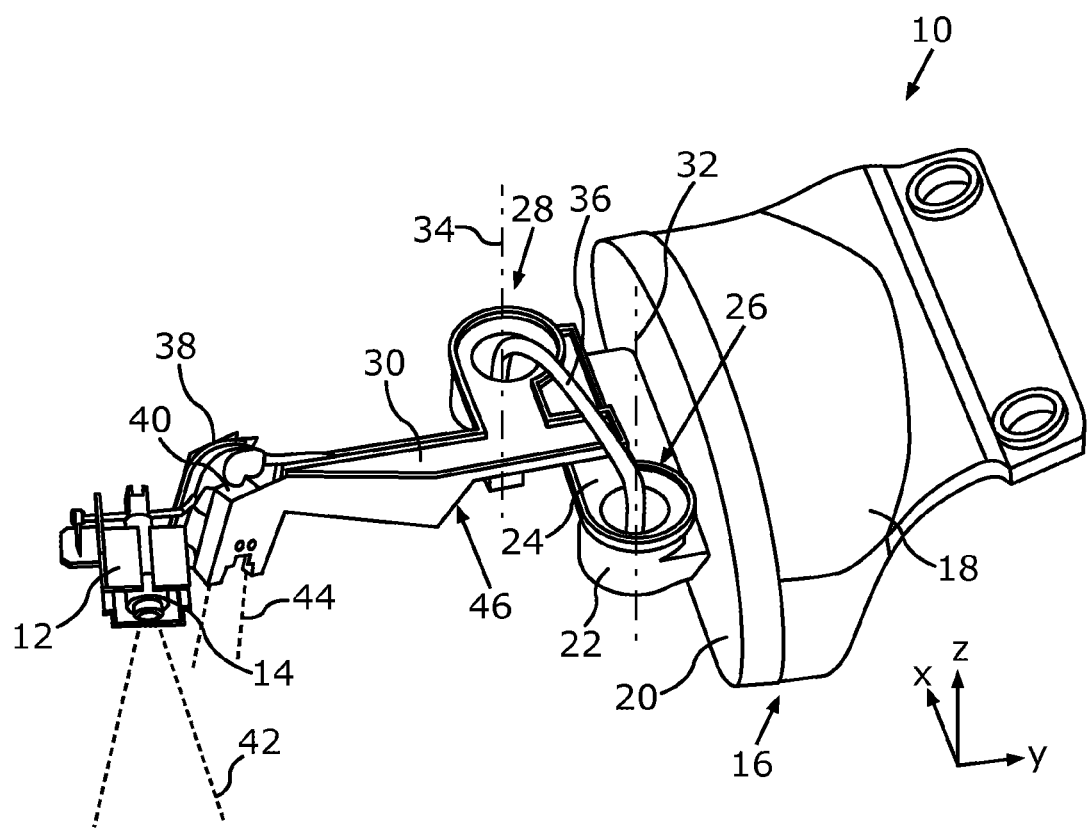
FIG. 1 a schematic, perspective view of a retaining device for an exterior add-on part of a motor vehicle.

FIG. 1 shows a retaining device 10 for an exterior add-on part 12 of a motor vehicle. In the present case, the exterior add-on part 12 is a camera device with a first camera 14, by means of which image data characteristic of an environment of the motor vehicle can be detected. The camera device may for example be used as a side mirror substitute.

By means of the retaining device 10, the exterior add-on part 12 can be positioned relative to the motor vehicle in a working position shown in FIG. 1. Furthermore, by means of the retaining device 10, the exterior add-on part 12 can be pivoted relative to the motor vehicle into at least one protection position, wherein via the pivoting into the protection position, the exterior add-on part 12 may yield under the effect of external force on the exterior add-on part 12, in order to protect the exterior add-on part 12 from damage. For example, the retaining device 10 is arranged in a side mirror region of the motor vehicle in order to detect, by means of the camera device, at least a field of vision normally detected by an exterior mirror.

As can be seen from FIG. 1, the retaining device 10 comprises a base part 16 which is configured to be attached to the outside of the motor vehicle. In the present case, the base part 16 comprises a vehicle adapter 18 which can be connected directly to the motor vehicle, and a retaining foot 20 connected to the vehicle adapter 18. The vehicle adapter 18, which can be adapted to a respective motor vehicle, allows the retaining device 10 to be connected to different vehicle types with low production costs. The retaining foot 20 has a receiver 22 on which a connecting element 24 can be held pivotably via a first pivot device 26. The base part 16 may be arranged on the outside of the motor vehicle in the vehicle transverse direction y of the motor vehicle, whereby a side region of the motor vehicle can be detected by means of the first camera 14.

In the present case, the connecting element 24 is elongate, wherein in the working position, the connecting element 24 extends with its longitudinal extent direction in the vehicle longitudinal direction x, and in the at least one protection position of the retaining device 10, the connecting element 24 is arranged with its longitudinal extent direction at an angle and hence obliquely to the vehicle longitudinal direction x. At one end, the connecting element 24 is connected to the retaining foot 20 of the base part 16 so as to be pivotable via the first pivot device 26. At the other end, the connecting element 24 is connected to a retaining element 30 via a second pivot device 28 so as to be pivotable relative to the retaining element 30.

The first pivot device 26 has a first pivot axis 32, about which the connecting element 24 is pivotable relative to the base part 16. The second pivot device 28 has a second pivot axis 34, about which the retaining element 30 and the connecting element 24 are pivotable relative to each other. To pivot the retaining device 10 between the at least one protection position and the working position, the retaining element 30, the connecting element 24 and the base part 16 are pivoted relative to each other about the pivot axes 32, 34. The second pivot axis 34 is arranged spaced from the first pivot axis 32, wherein the first pivot axis 32 and the second pivot axis 34 run parallel to each other.

Both the first pivot device 26 and the second pivot device 28 each comprise a spring device, wherein the spring devices may be connected together via a common leg spring. In the embodiment having the leg spring, the respective spring device means at least a region of the leg spring together with a respective stop region at which the leg spring is supported on the connecting element 24 and the base part 16, or on the connecting element 24 and the retaining element 30. By means of the respective spring devices, the retaining device 10 can be returned from the at least one protection position to the working position via the spring force of the leg spring. By means of the first spring device assigned to the first pivot device 26, the connecting element 24 can be returned from the at least one protection position into the working position, while by means of the second spring device assigned to the second pivot device 28, the retaining element 30 can be returned from the at least one protection position into the working position. Thus, via the leg spring, the connecting element 24 and the retaining element 30 can be returned jointly and simultaneously from the at least one protection position into the working position. Via the spring force of the leg spring, the retaining device 10 can be positioned in the working position and held in this working position by means of the spring force. In the present case, the spring force of the leg spring ensures that, in the working position, the connecting element 24 is oriented with its longitudinal extent direction parallel to a surface of the base part 16 and hence parallel to the vehicle longitudinal direction x of the motor vehicle. In the working position, the retaining element 30 is oriented at least substantially with its longitudinal extent direction protruding perpendicularly from the base part 16 and hence parallel to the vehicle transverse direction y. The retaining element 30 may have a stop by means of which, in the working position, the retaining element 30 stops against the connecting element 24 and/or against the base part 16. By means of the stop, the retaining element 30 may be positioned in the working position with particular precision.

Alternatively or additionally to the leg spring, the first spring device and the second spring device may each have a coil spring, the spring forces of which act in opposite rotational directions, so that the first pivot device 26 and the second pivot device 28 are loaded with opposite torsional moments about the first pivot axis 32 and the second pivot axis 34 according to the spring devices. Because of the spring forces of the coil spring or leg spring acting in different rotational directions about the respective pivot axis 32, 34, shift forces acting on the exterior add-on part 12 in the vehicle longitudinal direction x can be avoided by means of the retaining device 10.

Figure 2:
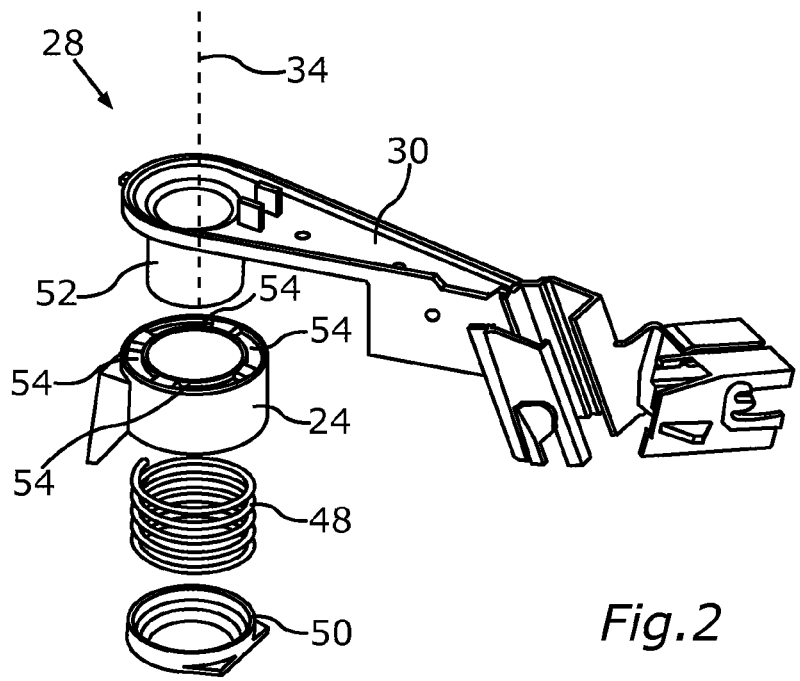
FIG. 2 a schematic exploded view of a second pivot device via which the retaining element is held on the connecting element.
Figure 3:
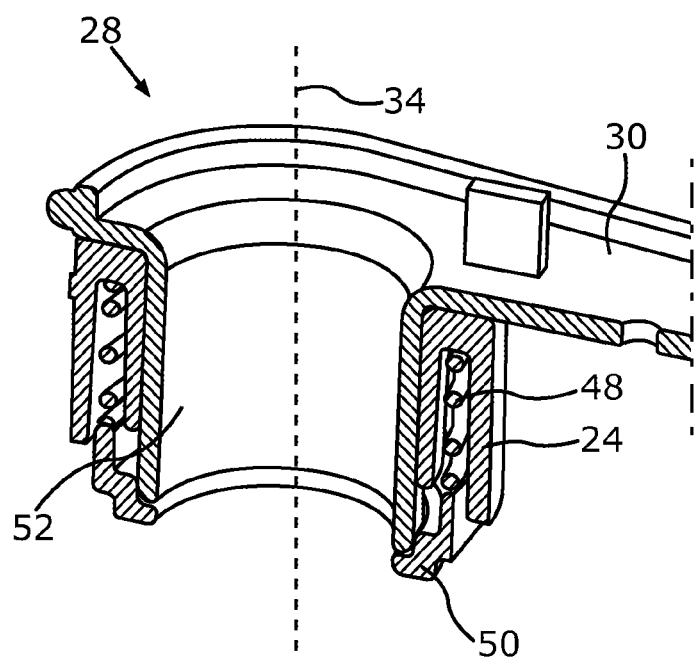
FIG. 3 a schematic, sectional view of the second pivot device.

FIGS. 2 and 3 show further alternative embodiments of the spring devices. As an example, here the spring device of the second pivot device 28 is shown, via which the retaining element 30 is connected to the connecting element 24. The spring device of the first pivot device 26 may be configured similarly to the spring device of the second pivot device 28. As FIG. 2 shows in a schematic, exploded illustration, the second pivot device 28 comprises a compression spring 48 and a clamping element 50. In addition, the retaining element 30 has a circular collar 52 which protrudes into an opening of the connecting element, and the center axis of which extends along the second pivot axis 34. A central axis of the compression spring 48 also runs along the second pivot axis 34, wherein a force direction of the compression spring 48 runs parallel to the second pivot axis 34. The clamping element 50 serves to support the compression spring 48, wherein the compression spring 48 transfers its spring force to the connecting element 24 so as to press the connecting element 24 against the retaining element 30. Here, corresponding latching elements are provided on respective contact faces of the connecting element 24 and retaining element 30, by means of which the connecting element 24 can be fixed in respective positions relative to the retaining element 30 and predefined by the latching elements.

FIG. 3 shows in cross-section the second pivot device 28. It is evident here that the clamping element 50 is supported against the collar 52 of the retaining element 30. Via the compression spring 48, the connecting element 24 is pressed against the retaining element 30 in the region of the contact faces, wherein latching elements 54 of the connecting element 24 can be brought into engagement with corresponding latching elements of the retaining element 30. For positioning the connecting element 24 relative to the retaining element 30, the corresponding latching elements may have oblique surface regions which can be brought into engagement with one another, and by means of which the retaining element 30 can be moved relative to the connecting element 24, and arranged in a defined position, by loading with spring force from the compression spring 48. Oblique surface regions in this context means that the surface regions enclose an angle with a plane which perpendicularly intersects the second pivot axis 34.

In an embodiment not shown in FIG. 1, the connecting element 24 may be held on the base part 16 so as to be pivotable relative to the base part 16 about a third pivot axis extending parallel to a longitudinal extent direction of the connecting element 24. This allows avoidance of the shift forces acting on the exterior add-on part 12 along the vehicle height direction z by means of the retaining device 10. Accordingly, by means of the retaining device 10, the exterior add-on part 12 can be protected from damage owing to the effect of a shift force. The retaining device 10 is consequently foldable in all directions and hence three-dimensionally.

As can be seen from FIG. 1, the retaining element 30 is configured to receive a further exterior add-on part 38 in addition to the exterior add-on part 12. The further exterior add-on part 38 in the present case is a second camera device having a second camera 40. A first field of vision 42 of the first camera 14 in the present case runs along the vehicle longitudinal direction x, for example towards the rear. A second field of vision 44 of the second camera 40 in the present case runs downward along a vehicle height direction z of the motor vehicle. The fields of vision 42, 44 of the cameras 14, 40 oriented in different directions allow a comprehensive detection of the environment of the motor vehicle. If the first camera 14 and the second camera 40 are arranged on the retaining element 30, the environment of the motor vehicle can be detected with a high resolution.

Alternatively or additionally to the second camera 40, an antenna and/or a positioning light and/or a direction indicator light and/or a heating element and/or a cleaning device may be arranged on the retaining element 30 for operation of the motor vehicle and/or the first camera 14 and/or the second camera 40.

In order to ensure a supply of electrical energy to the first camera 14 and/or the second camera 40 from the motor vehicle, an energy line is provided which is guided along the retaining element 30 from the respective camera 14, 40 to the base part 16 for connection of the camera 14, 40 to the motor vehicle. To guide the energy line, the retaining element 30 has a channel 46 in which the energy line can be received. Alternatively or additionally, a data line may be received in the channel 46, by means of which a data connection can be created between the first camera 14 and/or the second camera 40 and the motor vehicle. By means of the channel 46, the energy line and the data line can be protected from damage since the channel 46 surrounds the energy line and/or the data line on at least three sides in the present case and thus protects it. The channel 46 of the retaining element 30 allows the cable of the data line and/or energy line to be attached to the retaining element 30 from below in the vehicle height direction z, so that the data line and/or the energy line can be mounted in linear fashion particularly simply and the cables are not loose. The data line and the energy line in the present case are received in a common cable guide 36, by means of which the data line and the energy line can be conducted from the base part 16, for example the motor vehicle, to the exterior add-on part 12.

The connecting element 24 may alternatively be described as a boom. The retaining element 30 may alternatively be described as a camera arm.

The retaining device 10 may be arranged in the working position or be folded forward or rearward in a folded position along the vehicle longitudinal direction x, wherein the retaining element 30 is oriented with its longitudinal extent direction in the vehicle longitudinal direction x. The retaining device 10 may have a latching function, wherein the retaining device 10 is held in the working position by means of the latching function. The third pivot axis allows bending of the retaining device 10 upward and downward in the vehicle height direction z.

At least the connecting element 24 and the retaining element 30 may be surrounded by a housing (not shown in the figures) in order to protect the connecting element 24 and retaining element 30 from damage. The housing may have a mounting flap arranged at the bottom in the vehicle height direction z, which allows simple access to or intervention on the exterior add-on part 12 and further exterior add-on part 38, and for example the first camera 14 and second camera 40.

The retaining device 10 may alternatively be used on motor vehicles without camera monitoring system. Here, by means of the retaining device 10, sensors may be held on the outside of the motor vehicle as exterior add-on parts for highly autonomous driving.

Overall, the example shows a device for fixing optical sensors.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A retaining device for an exterior add-on part of a motor vehicle comprising:
   a base part mountable to an exterior on the motor vehicle;
   a connecting element mounted to the base part with a first pivoting device wherein the connecting element can be pivoted relative to the base part about a first pivot axis between a working position and at least one protection position and wherein in the working position, the connecting element is oriented with its longitudinal extent direction at least substantially parallel to a surface of the base part;
   a first spring device, via a spring force of which the connecting element can be returned from the at least one protection position into the working position;
   a retaining element mounted on the connecting element with a second pivoting device having a second spring device having a spring force, wherein the retaining device is pivotable about a second pivot axis, which is spaced apart from the first pivot axis and parallel thereto, between the working position and the at least one protection position; and
   wherein the retaining element can be returned from the at least one protection position into the working position with the second spring device.

2. The retaining device as claimed in claim 1, wherein the exterior add-on part is a camera device to be held on the base part via the connecting element.

3. The retaining device as claimed in claim 1, wherein the first spring device and the second spring device each comprise a coil spring, the spring forces of which point in opposite directions.

4. The retaining device as claimed in claim 1, wherein the first spring device and the second spring device each comprise a compression spring, the spring forces of which run along the pivot axes, respectively.

5. The retaining device as claimed in claim 1, wherein in addition to the exterior add-on part, at least one further exterior add-on part can be received by the retaining element.

6. The retaining device as claimed in claim 5, wherein the further exterior add-on part is one of: a camera device, an antenna, a positioning light, a direction indicator light, a heating element, and a cleaning device.

7. The retaining device as claimed in claim 5, wherein the exterior add-on part and the further add-on part are each camera devices, wherein a first field of vision of a first of the camera devices is oriented towards a rear in a vehicle longitudinal direction, and a second field of vision of the second of the camera devices is oriented downward in a vehicle height direction.

8. The retaining device as claimed in claim 1, wherein the connecting element is held on the base part and is pivotable relative to the base part about a third pivot axis extending parallel to a longitudinal extent direction of the connecting element.

9. The retaining device as claimed in claim 1, wherein the retaining element has a channel which can receive at least one of: a data line, an energy line for a data connection, and an energy connection of the exterior add-on part.

10. A system with a retaining device for an exterior add-on part of a motor vehicle comprising:
    a base part mountable to an exterior on the motor vehicle;
    a connecting element mounted to the base part with a first pivoting device wherein the connecting element can be pivoted relative to the base part about a first pivot axis between a working position and at least one protection position, and wherein in the working position, the connecting element is oriented with its longitudinal extent direction at least substantially parallel to a surface of the base part;
    a first spring device, via a spring force of which the connecting element can be returned from the at least one protection position into the working position;
    a retaining element mounted on the connecting element with a second pivoting device having a second spring device having a spring force, wherein the retaining device is pivotable about a second pivot axis, which is spaced apart from the first pivot axis and parallel thereto, between the working position and the at least one protection position; and
    wherein the retaining element can be returned from the at least one protection position into the working position with the second spring device.

11. The system as claimed in claim 10, wherein the exterior add-on part is a camera device to be held on the base part via the connecting element.

12. The system as claimed in claim 10, wherein the first spring device and the second spring device each comprise a coil spring, the spring forces of which point in opposite directions.

13. The system as claimed in claim 10, wherein the first spring device and the second spring device each comprise a compression spring, the spring forces of which run along the pivot axes, respectively.

14. The system as claimed in claim 10, wherein in addition to the exterior add-on part, at least one further exterior add-on part can be received by the retaining element.

15. The system as claimed in claim 14, wherein the further exterior add-on part is one of: a camera device, an antenna, a positioning light, a direction indicator light, a heating element, and a cleaning device.

16. The system as claimed in claim 14, wherein the exterior add-on part and the further add-on part are each camera devices, wherein a first field of vision of a first of the camera devices is oriented towards a rear in a vehicle longitudinal direction, and a second field of vision of the second of the camera devices is oriented downward in a vehicle height direction.

17. The system as claimed in claim 10, wherein the connecting element is held on the base part and is pivotable relative to the base part about a third pivot axis extending parallel to a longitudinal extent direction of the connecting element.

18. The system as claimed in claim 10, wherein the retaining element has a channel which can receive at least one of: a data line, an energy line for a data connection, and an energy connection of the exterior add-on part.

19. A motor vehicle having a retaining device comprising:
    a base part mountable to an exterior on the motor vehicle;
    a connecting element mounted to the base part with a first pivoting device wherein the connecting element can be pivoted relative to the base part about a first pivot axis between a working position and at least one protection position, and wherein in the working position, the connecting element is oriented with its longitudinal extent direction at least substantially parallel to a surface of the base part;

a first spring device, via a spring force of which the connecting element can be returned from the at least one protection position into the working position;

a retaining element mounted on the connecting element with a second pivoting device having a second spring device wherein the retaining device is pivotable about a second pivot axis, which is spaced apart from the first pivot axis and parallel thereto, between the working position and the at least one protection position; and wherein the retaining element can be returned from the at least one protection position into the working position with the second spring device.

\* \* \* \* \*